United States Patent [19]
Collister

[11] 4,207,794
[45] Jun. 17, 1980

[54] KEY BOLT

[76] Inventor: Frank C. Collister, 3641 Appell Dr., Port Clinton, Ohio 43452

[21] Appl. No.: 893,571

[22] Filed: Apr. 5, 1978

[51] Int. Cl.² .......................... F16B 19/00; F16B 3/00
[52] U.S. Cl. ........................................ 85/7; 85/5 CP; 403/154; 403/317
[58] Field of Search ................. 85/5 CP, 7, 3 R, 3 K, 85/8.3, 5 N; 24/211 L, 201 LP, 209, 100, 100.5; 280/515; 403/154, 155, 317; 151/5, 6

[56] References Cited
U.S. PATENT DOCUMENTS

| 925,189 | 6/1909 | Hoover | 85/8.3 |
|---|---|---|---|
| 926,568 | 6/1909 | Huey | 85/8.3 |
| 1,561,771 | 11/1925 | Best | 151/5 |
| 1,925,174 | 9/1933 | Cremean | 24/211 L |
| 2,297,831 | 10/1942 | Heard | 85/5 CP |
| 2,361,491 | 10/1944 | Nagin | 85/5 |
| 2,782,672 | 2/1957 | Davis | 85/5 CP |
| 3,476,007 | 11/1969 | Collister | 85/3 R |
| 3,673,910 | 7/1972 | Collister | 85/3 R |
| 3,712,356 | 1/1973 | Petroshanoff | 151/6 |
| 3,861,267 | 1/1975 | Collister | 85/3 R |

Primary Examiner—Rodney H. Bonck
Attorney, Agent, or Firm—Baldwin, Egan, Walling & Fetzer

[57] ABSTRACT

A key bolt including a shank having a bolt head at one end thereof and having an aperture extending transversely in the shank in spaced relation to the head, with a locking key bar disposed in the aperture and movable from a retracted position wherein it is disposed generally within the confines of the shank to an extended locking position, and vice versa, for holding the key bolt against accidental removal or displacement; a portion of the key is resilient for holding the latter in selected position lengthwise of the aperture, together with positive abutment means thereon for preventing inadvertent retraction of the key bar to retracted position.

13 Claims, 6 Drawing Figures

KEY BOLT

This invention relates to key bolts and the like, and more particularly to a key bolt having a locking key extendable transversely of the bolt, from a retracted position wherein it is disposed in a transversely oriented aperture in the key bolt shank, to a locking position wherein it projects laterally of the aperture.

BACKGROUND OF THE INVENTION

Many types of key bolts are known in the art including the above discussed type wherein a locking key is movable in a transversely arranged aperture in the bolt shank. However, most of the prior art key bolts with such a locking key are of the automatic locking type generally embodying some arrangement of spring means, for automatically urging the locking key laterally of the shank of the bolt. U.S. Pat. No. 1,925,174 issued on Sept. 5, 1933 To W. F. Cremean discloses one type of selflocking key bolt. U.S. Pat. No. 2,297,831 issued Oct. 6, 1942 to A. S. Heard discloses another type of automatically locking key bolt, and U.S. Pat. No. 2,361,491 dated Oct. 31, 1944 likewise discloses an automatically locking key bolt.

Applicant's own U.S. Pat. Nos. 3,476,007, 3,673,910 and 3,861,267 disclose key bolts of the type wherein a locking key is disposed in a slot at the end of the bolt shank, which receives the key therein, with the key being rotatable 90° from an unlocking position where it is disposed generally parallel to the axis of the bolt shank, to a locking position where it is disposed perpendicular to the bolt shank.

SUMMARY OF THE INVENTION

The present invention provides a key bolt embodying a transversely extending aperture in the shank of the bolt, with the aperture receiving a locking key member which is generally lineally movable from a retracted position disposed within the aperture, to a locking position wherein the key projects laterally of the bolt shank, and which includes means coacting between the locking key and the defining surface of the aperture for retaining the key in selected lengthwise positional relation in the aperture, and in a manner wherein the key bolt is insured against inadvertent or accidental endwise removal or displacement, yet which can be readily removed, when desired, by deactivating the locking key.

Accordingly, it is an object of the invention to provide a novel key bolt of the type wherein the locking key is movable generally transversely of the bolt from an inactive position where it is disposed substantially within the confines of the bolt shank, to an active locking position wherein it projects laterally of the shank.

A further object of the invention is to provide a key bolt of the above type which is simple in construction, inexpensive to manufacture, highly effective in operation, and wherein the locking key is held in the selected lengthwise position relative to its mounting aperture in the bolt shank.

A still further object of the invention is to provide a key bolt of the above type which includes a pin extending transversely of the aperture through the bolt shank, and which extends through a slot in the locking key, and wherein a portion of the key is resilient so the key contacts the defining surface of the aperture, for frictionally retaining the key in selected lengthwise positional relation in the aperture, with a shoulder formed on the key adapted for engaging an outer confronting defining edge of the aperture so as to interlock the key with the edge and prevent inadvertent movement of the key from its maximum extended locking position back into the aperture, with the aforementioned pin being adpated to generally limit the outward extension of the key relative to the aperture and the bolt shank.

Other objects and advantages of the invention will be apparent from the following description taken in conjunction with the accompanying drawings wherein:

DESCRIPTION OF PREFERRED EMBODIMENTS

The key bolt 10 includes a shank 12 having a head 14 at one end thereof. The other end of the shank in the embodiment illustrated is tapered inwardly, as at 16, for facilitating the entry thereof into the usual opening in which the bolt 10 is adapted to be received.

Figure 1:
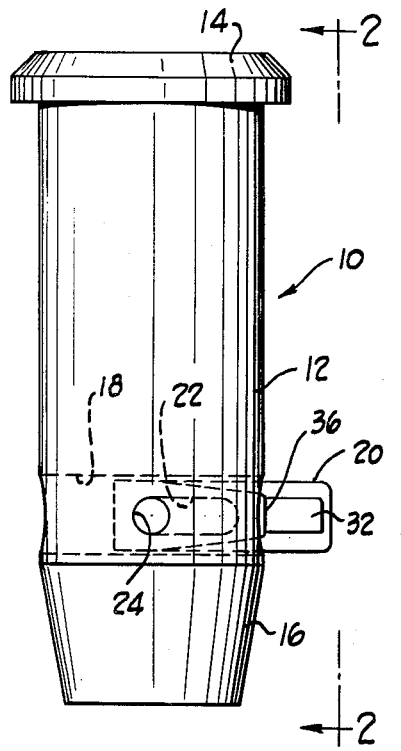
FIG. 1 is an elevational view of the key bolt embodying the invention and showing the locking key thereof in maximum projected locking position.
Figure 2:
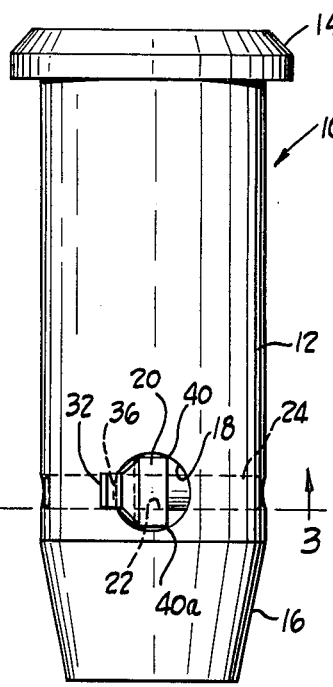
FIG. 2 is a view taken generally along the plane of line 2—2 of FIG. 1 looking in the direction of the arrows.
Figure 3:
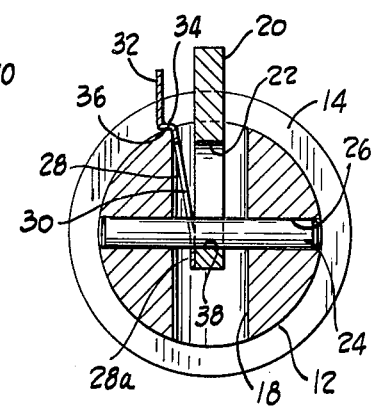
FIG. 3 is a sectional view taken generally along the plane of line 3 of FIG. 2, and illustrating the coaction between the shoulder on the resilient tongue for preventing inadvertent retraction of the locking key back into the aperture.
Figure 4:
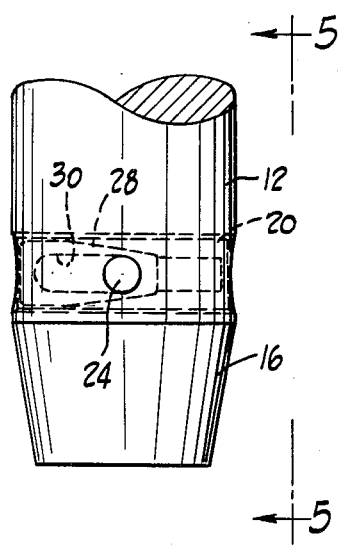
FIG. 4 is a fragmentary, elevational view generally similar to FIG. 1, but showing the locking key retracted back into the transversely extending aperture in the shank of the key bolt.
Figure 5:
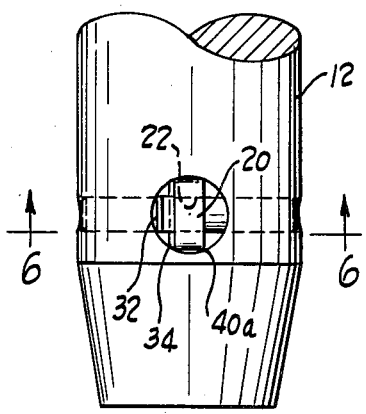
FIG. 5 is an elevational view takn generally along the plane of line 5—5 of FIG. 4 looking in the direction of the arrows.

An aperture 18 extends transversely of the bolt shank as shown, and receives therein a locking key 20 which is adapted for lengthwise sliding movement from an inactive position wherein it is disposed within the aperture 18 substantially within the confines of the bolt shank, to locking position wherein it projects laterally of the shank. FIGS. 1, 2 and 3 illustrate the locking key in its outermost locking position, while FIGS. 4, 5 and 6 illustrate the locking key in its retracted position.

Locking key 20 in the embodiment illustrated, comprises a rectangular shaped, elongated bar-like member which is slidingly received in generally circular (in transverse cross section) aperture 18, which in the embodiment illustrated extends completely through the shank 12. The locking key 20 includes lengthwise extending elongated slot 22 therein. A pin 24 is mounted in an opening 26 extending transversely through the key bolt shank, and generally perpendicular to the aperture 18, in generally centrally mounted relation with respect thereto (FIG. 3). Pin 24 can be force fit into opening 26, for retaining the pin 24 in the position illustrated.

A resilient tongue 28 is secured as at 28a, to key 20, preferably adjacent one end of the latter, and is biased diagonally laterally therefrom, so as to coact between the key and the defining surface of the aperture for retaining the key in selected lengthwise positional relation in the aperture 18. Tongue 28 includes an elongated slot 30 running lengthwise thereof, and generally aligned or oriented with the aforementioned slot 22 in the key member 20, so that pin 24 extends through the slot 30 in tongue 28 as well as through the slot 22 in key 20.

Figure 6:
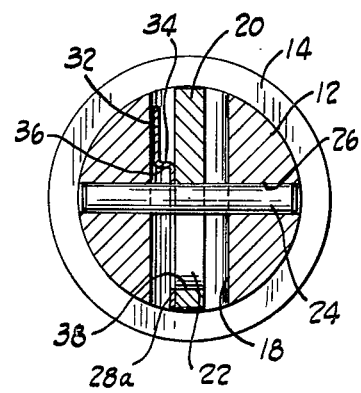
FIG. 6 is a sectional view taken generally along the plane of line 6—6 of FIG. 5.

The tongue 28 includes a tab portion 32 on its distal end, which is adapted for gripping by a workman's fingers so as to force the tongue against its resistance to deformation, laterally in the direction of the key, for permitting the key to be slidingly retracted back into the aperture in the key shank from an extended position, as shown for instance in FIG. 3 to retracted position, as shown for instance in FIG. 6.

Tongue 28 preferably also includes shoulder 34 thereon intermediate tab 32 and the tongue connection 28a to the key 20, which is adapted for engaging the outer confronting defining edge 36 of the aperture 18 in the maximum extended position of the locking key 20, so as to prevent inadvertent movement of the key from its outermost locking position back into the aperture. It will be understood that a workman, by merely squeezing with his fingers between the tab 32 and the key 20, can swing the resilient tongue toward the key and clear the shoulder 34 from interfering engagement with the defining edge 36, so that then lengthwise movement of the key and attached tongue into the aperture 18 can be accomplished. Tongue 28 may be attached to key 20 by any suitable means, as for instance welds, or tongue 28 could be integrally formed with key 20.

When the key is in its maximum locking position as shown in FIG. 3, and the shoulder 34 on the tongue overlaps the edge 36, the pin 24 is disposed closely adjacent to or in engagement with the confronting end 38 of the slot 22 in the key 20, to limit the lateral projection of the key relative to the aperture.

It will be noted that in the embodiment illustrated, the key 20 projects further laterally from the shank of the key bolt than does the tab 32 of the tongue 28. Moreover, the resiliency of the tongue urges the locking key laterally in aperture 18, so that the key bar corners generally engage the defining interior surface of the aperture, as at 40, 40a (FIGS. 2 and 5) thus frictionally holding the key in the aperture in whatever selected lengthwise position it occupies relative to the aperture. Thus the locking key 20 has considerable stability in whatever position it occupies in the aperture.

Aperture 18 is preferably of a size that a workman can insert a finger into one end thereof, or such end may be countersunk deep enough, so as to provide for forcing the key 20 laterally out of the aperture to locked position or where it can be gripped by the fingers, for pulling it further outwardly until the locking shoulder 34 engages the edge 36, to lock the key in its maximum extended position.

Although the invention has been shown and described with respect to key bolts or clevis pins, it will be understood that it may be employed on any type of bolt, yoke pin, clevis pin, drawbar pin, connecting rod linkage or elongated shank, that must be locked in a receiving opening.

From the foregoing description and accompanying drawings it will be seen that the invention provides a novel key bolt which includes a shank having a bolt head on one end thereof and an aperture extending transversely in the shank in spaced relation from the bolt head, with a locking key disposed in the aperture and adapted for sliding relation relative thereto, and from a locking position wherein it projects exteriorly of the aperture to a retracted position wherein it is enclosed in the aperture, substantially within the confines of the shank, and vice versa, together with means coacting between the key and the defining surface of the aperture, for retaining the key in selected lengthwise positional relation in the aperture.

The terms and expressions which have been used have been used as terms of description and not of limitation, and there is no intention, in the use of such terms and expressions, of excluding any equivalents of any of the features shown or described, or portions thereof, and it is recognized that various modifications are possible within the scope of the invention claimed.

What is claimed is:

1. A key bolt including a shank having a bolt head on one end thereof an aperture extending transversely in said shank in spaced relation from said head, a key disposed in said aperture and adapted for lengthwise sliding relation relative thereto and from a locking position wherein it projects exteriorly of said aperture to a retracted position wherein it is disposed in said aperture substantially within the confines of said shank, and vice versa, and means coacting between said key and the defining surface of said aperture for retaining said key in selected lengthwise positional relation in said aperature and wherein said key is of generally rectangular bar-shaped configuration, said aperture being of generally circular configuration, said key being of such vertical dimension so as to be receivable in generally snug but lengthwise sliding relation in said aperture, said means comprising a resilient tongue on said key and being biased laterally thereof, said tongue when said key is disposed within said aperture forcing said key laterally against the defining surface of said aperture of frictionally hold said key in said aperture.

2. A key bolt in accordance with claim 1 including means extending transversely of said aperture and coacting with said key for limiting the projection of said key relative to said aperture.

3. A key bolt in accordance with claim 2 wherein the last mentioned means comprises a pin extending in force-fit relation through an opening formed in said shank.

4. A key bolt in accordance with claim 3 wherein said key has a slot therein, said pin extending through said slot with said key being slidable relative to said pin lengthwise of said aperture.

5. A key bolt in accordance with claim 4, wherein said resilient tongue is secured adjacent one end thereof to an end of said key, said tongue having a slot therein formed generally complementary to said slot in said key and receiving said pin therethrough.

6. A key bolt in accordance with claim 1 wherein said resilient tongue is secured to said key said tongue including a tab on the distal end thereof adapted for gripping by a workman's finger to force the tongue against is resistance to deformation laterally in the direction of said key, for permitting the key to be slidingly retracted into said aperture in said key shank.

7. A key bolt in accordance with claim 6, wherein said key when in said locking position projects further laterally from said shank as compared to said tongue.

8. A key bolt in accordance with claim 6, wherein said tongue embodies a shoulder thereon intermediate said tab and the connection of said tongue to said key, adapted for engaging an outer confronting defining edge of said aperture, so as to interlock the tongue with the said edge and prevent inadvertent movement of said key from said locking position back into said aperture.

9. A key bolt in accordance with claim 8, wherein said key has an elongated slot therein, a pin extending transversely of said aperture through said slot, said pin being adapted to generally engage a corresponding end of said slot in said key when said shoulder on said tongue is coacting with said edge of said aperture.

10. A key bolt in accordance with claim 5 wherein said means includes means for interlocking said key in extended positional relation in said aperture, the last mentioned interlocking means comprising a shoulder on said tongue intermediate said tab and the connection of said tongue to said key, adapted for engaging an outer confronting defining edge of said aperture, so as to interlock the tongue with said edge and prevent inadvertent movement of said key from said locking position back into said aperture, said connection of said tongue to said key being located adjacent one end of said key with said tongue extending lengthwise in the direction of the other end of said key, the lengthwise axis of said tongue being disposed substantially in a plane passing through the lengthwise axis of said key and substantially perpendicular to said axis of said shank.

11. A key bolt in accordance with claim 9, wherein said bolt shank is tapered at the opposite end thereof in converging relation, and below the location of said aperture in said shank.

12. A key bolt in accordance with claim 9, wherein said aperture extends completely through said shank and is of a size that the finger of a workman can be inserted through one end thereof to force said key outwardly of said aperture from said retracted position into locking position.

13. A key bolt in accordance with claim 9 wherein said means is an integral portion of said key.

* * * * *